(12) United States Patent
Nakamura

(10) Patent No.: US 12,712,988 B2
(45) Date of Patent: Aug. 18, 2026

(54) PROJECTOR

(71) Applicant: SEIKO EPSON CORPORATION, Tokyo (JP)

(72) Inventor: Norio Nakamura, Matsumoto (JP)

(73) Assignee: SEIKO EPSON CORPORATION, Tokyo (JP)

( * ) Notice: Subject to any disclaimer, the term of this patent is extended or adjusted under 35 U.S.C. 154(b) by 368 days.

(21) Appl. No.: 18/602,352

(22) Filed: Mar. 12, 2024

(65) Prior Publication Data

US 2024/0314274 A1 Sep. 19, 2024

(30) Foreign Application Priority Data

Mar. 13, 2023 (JP) ................................ 2023-038503

(51) Int. Cl.
*H04N 9/31* (2006.01)
*G02F 1/1335* (2006.01)

(52) U.S. Cl.
CPC ..... *H04N 9/3158* (2013.01); *G02F 1/133526* (2013.01)

(58) Field of Classification Search
CPC .. G03B 21/005; G03B 21/006; G03B 21/008; G03B 21/28; G03B 21/145; G03B 21/208; G03B 21/2013; G03B 21/2033; G03B 21/2053; H04N 9/315; H04N 9/3108; H04N 9/3141; H04N 9/3152; H04N 9/3161; H04N 9/3158; H04N 9/3164; H04N 9/3182; G02F 1/133526; G02F 1/133603; G02F 1/133; G02F 1/13476; G02F 1/1326
See application file for complete search history.

(56) References Cited

U.S. PATENT DOCUMENTS 5,187,599 A 2/1993 Nakanishi et al.
2012/0154713 A1* 6/2012 Kwon .............. G02F 1/133526 349/64
2020/0249555 A1* 8/2020 Akiyama ............. H04N 9/3152
2021/0088888 A1* 3/2021 Nakamura ............. G03B 21/20

FOREIGN PATENT DOCUMENTS

JP H03-267918 A 11/1991
JP H10-206813 A 8/1998
JP 2000-147500 A 5/2000

* cited by examiner

*Primary Examiner* — Sultan Chowdhury
(74) *Attorney, Agent, or Firm* — Dority & Manning, P.A

(57) ABSTRACT

A projector of the present disclosure includes a light source, and a light modulator, the light modulator has a liquid crystal panel, a multi-lens array entered by first, second, third lights, and a light refractor array. The liquid crystal panel has a plurality of pixels and each of the plurality of pixels has first, second, third sub-pixels. The multi-lens array has a plurality of lenses entered by the first, second, third lights. The light refractor array has a first light refractor over a boundary between the first, second pixels and a second light refractor over a boundary between the first, third pixels. The first light from the first pixel and the third light from the second pixel enter the first light refractor, and the third light from the first pixel and the first light from the third pixel enter the second light refractor.

7 Claims, 7 Drawing Sheets

PROJECTOR

The present application is based on, and claims priority from JP Application Serial Number 2023-038503, filed Mar. 13, 2023, the disclosure of which is hereby incorporated by reference herein in its entirety.

BACKGROUND

1. Technical Field

The present disclosure relates to a projector.

2. Related Art

JP-A-10-206813 discloses a projector including a light source outputting a white light, three dichroic mirrors separating the white light output from the light source into a red light, a green light, and a blue light, one liquid crystal panel containing a plurality of pixels each including three sub-pixels corresponding to the red light, the green light, and the blue light, and a micro-lens array provided at a light incident side of the liquid crystal panel and including a plurality of micro-lenses placed with respect to each of the three sub-pixels. In the projector, the respective color lights separated from the white light by the dichroic mirrors are entered into the three sub-pixels in the liquid crystal panel at different angles.

JP-A-03-267918 discloses a transmissive display apparatus including one liquid crystal panel, a light incident-side lens array placed at a light incident side of the liquid crystal panel and having a plurality of lenses corresponding to respective pixels of the liquid crystal panel, and a light exiting-side lens array placed at a light exiting side of the liquid crystal panel and having a plurality of lenses corresponding to the respective pixels of the liquid crystal panel. In the transmissive display apparatus, the light exiting-side lens array is provided, and thereby, the spread of the light output from the respective pixels of the liquid crystal panel is suppressed and a loss of the light is reduced.

For example, it may be considered that, in the above described configuration of the projector of JP-A-10-206813, to reduce the loss of the light output from the liquid crystal panel, the above described configuration of JP-A-03-267918 is combined and a micro-lens array is further placed at the light exiting side.

However, the color lights output from the two sub-pixels at ends of the three sub-pixels in a certain pixel of the liquid crystal panel enter micro-lenses adjacent to the micro-lens corresponding to the certain pixel and become diverging lights, and may be hard to be taken into a projection lens and may be a light loss.

SUMMARY

In order to solve the above described problem, according to an aspect of the present disclosure, a projector including a light source device outputting a light containing a first color light, a second color light, and a third color light different in color from one another, a light modulator modulating the first color light, the second color light, and the third color light output from the light source device based on an image signal, and a projection optical device projecting the light modulated in the light modulator, wherein the light modulator has a multi-lens array respectively entered by the first color light, the second color light, and the third color light output from the light source at different angles, one liquid crystal panel entered by the light output from the multi-lens array, and a light refractor array entered by the light output from the liquid crystal panel, the liquid crystal panel has a plurality of pixels containing a first pixel, a second pixel, and a third pixel, each of the plurality of pixels has a first sub-pixel entered by the first color light collected by the multi-lens array, a second sub-pixel placed adjacent to the first sub-pixel in a first direction and entered by the second color light collected by the multi-lens array, and a third sub-pixel placed adjacent to the second sub-pixel in the first direction and entered by the third color light collected by the multi-lens array, the multi-lens array has a plurality of macro lenses provided to correspond to each of the plurality of pixels, and the light refractor array has a first light refractor placed over a boundary between the first pixel and the second pixel adjacent to the first pixel at one side in the first direction of the plurality of pixels and a second light refractor placed over a boundary between the first pixel and the third pixel adjacent to the first pixel at the other side in the first direction is provided.

BRIEF DESCRIPTION OF THE DRAWINGS

FIG. 4 shows a configuration of a light refractor array of a second embodiment.

FIG. 7 shows a configuration of a light refractor array of a fifth embodiment.

DESCRIPTION OF EMBODIMENTS

Figure 1:
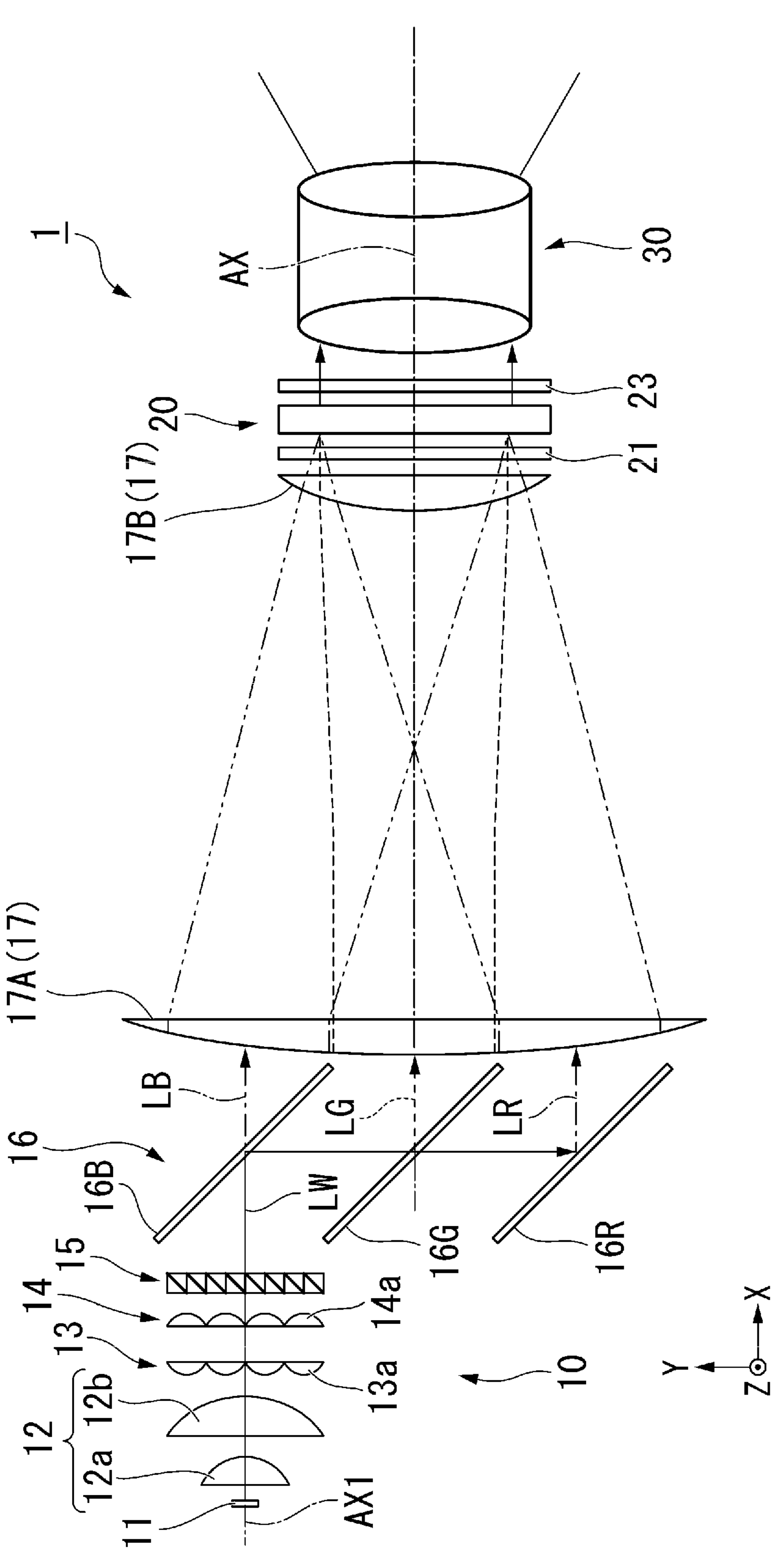
FIG. 1 is a schematic configuration diagram of a projector of a first embodiment.

As below, one embodiment of the present disclosure will be explained in detail with reference to the drawings. Note that, in the drawings used in the following explanation, characteristic parts may be enlarged for convenience for clearly showing the characteristics and dimension ratios etc. of the respective component elements are not necessarily the same as real dimension ratios.

First Embodiment

FIG. 1 is a schematic configuration diagram of a projector of the embodiment.

A projector 1 of the embodiment modulates a light output from a light source device 10, forms an image according to image information, and enlarges and projects the formed image on a projected surface such as a screen. That is, the projector 1 of the embodiment modulates the light output from the light source device 10 by a light modulator 20 including one liquid crystal panel 22, forms an image, and projects the formed image. The projector 1 of the embodiment is the so-called single-LCD projector.

In the projector 1, an axis through which a principal ray of an image light is defined as "principal optical axis AX". Note that, in the following description, an XYZ orthogonal coordinate system is used for explanation as necessary. A Z-axis is an axis along a vertical direction of a space in which the projector 1 is placed. An X-axis is an axis parallel to the principal optical axis AX. A Y-axis is an axis along a horizontal direction of the projector and orthogonal to the X-axis and the Z-axis.

As shown in FIG. 1, the projector 1 of the embodiment includes the light source device 10, the light modulator 20, and a projection optical device 30.

The light source device 10 includes a light source 11, a collimator system 12, a first lens array for light source 13, a second lens array for light source 14, a polarization conversion element 15, a color separation system 16, and a superimposition system 17. The color separation system 16 and the superimposition system 17 of the light source device 10 and the light modulator 20 and the projection optical device 30 are arranged along the principal optical axis AX of the projector 1.

The light source 11 includes a white LED and outputs a white light LW containing a red light, a green light, and a blue light different in color from one another. Note that, in the embodiment, the LED is used as the light source, but not limited to that. A light source using a lamp or a laser diode may be used or sunlight may be collected and used as a light source.

The collimator system 12 parallelizes and guides the white light LW emitted from the light source 11 to the first lens array for light source 13. The collimator system 12 includes a first lens 12*a* and a second lens 12*b*.

The first lens array for light source 13 has a plurality of lenses 13*a* arranged in a matrix form within a a plane orthogonal to a center axis of the white light LW entering from the light source 11, i.e., an illumination optical axis AX1 of the light source 11. The first lens array for light source 13 divides the white light LW entering from the light source 11 into a plurality of partial luminous fluxes by the plurality of lenses 13*a*.

The second lens array for light source 14 has a plurality of lenses 14*a* arranged in a matrix form within the plane orthogonal to the illumination optical axis AX1 and corresponding to the plurality of lenses 13*a* of the first lens array for light source 13. Into the respective lenses 14*a*, the partial luminous fluxes output from the lenses 13*a* facing the lenses 14*a* are entered. The respective lenses 14*a* enter the partial luminous fluxes into the polarization conversion element 15.

The polarization conversion element 15 has a configuration in which a polarization separation film and a half-wave plate as a wave plate are arranged in an array form. The polarization conversion element 15 converts the light output from the second lens array for light source 14 into a predetermined linearly-polarized light. Thereby, the polarization direction of the light entering the light modulator 20 can be aligned with a transmission axis direction of a light incident-side polarizer 21 placed at a light incident side of the light modulator 20, which will be described later.

The white light LW converted into the linearly-polarized light by the polarization conversion element 15 enters the color separation system 16. The color separation system 16 has a first dichroic mirror 16B, a second dichroic mirror 16G, and a mirror 16R, and separates the white light LW into a red light LR, a green light LG, and a blue light LB. In the embodiment, the red light LR corresponds to "first color light", the green light LG corresponds to "second color light", and the blue light LB corresponds to "third color light".

The first dichroic mirror 16B includes a dielectric multilayer film having a property of selectively transmitting a light in a blue wavelength range and reflecting lights in the other wavelength ranges. The first dichroic mirror 16B is placed on the illumination optical axis AX1 of the light source 11 and forms an angle of 45° with the illumination optical axis AX1.

The first dichroic mirror 16B transmits and outputs the blue light LB of the white light LW in the +X direction and reflects and outputs the light containing the green light LG and the red light LR of the white light LW in the −Y direction.

The second dichroic mirror 16G includes a dielectric multilayer film having a property of selectively transmitting a light in a red wavelength range and reflecting the light in a green wavelength range. The second dichroic mirror 16G is provided at the −Y side of the first dichroic mirror 16B and placed in parallel to the first dichroic mirror 16B.

The second dichroic mirror 16G reflects and outputs the green light LG of the light containing the green light LG and the red light LR entering from the first dichroic mirror 16B in the +X direction and transmits and outputs the red light LR in the −Y direction.

The mirror 16R is provided at the −Y side of the second dichroic mirror 16G and placed in parallel to the second dichroic mirror 16G.

The mirror 16R reflects and outputs the red light LR entering from the second dichroic mirror 16G in the +X direction.

In the above described manner, the color separation system 16 can separate the white light LW into the red light LR, the green light LG, and the blue light LB in the Y directions and enter the lights into the superimposition system 17. That is, the red light LR, the green light LG, and the blue light LB enter different locations on a light incident surface of a superimposing lens 17A of the superimposition system 17, which will be described later.

The superimposition system 17 includes the superimposing lens 17A and a field lens 17B.

The superimposing lens 17A and the field lens 17B superimpose and enter the red light LR, the green light LG, and the blue light LB into the light modulator 20. Specifically, the red light LR, the green light LG, and the blue light LB enter respective lenses 24*a* of a light incident-side multi-lens array 24, which will be described later, provided in the light modulator 20 at different angles in the Y directions by the superimposition system 17 and the field lens 17B.

The light modulator 20 modulates the blue light LB, the green light LG, and the red light LR output from the light source device 10 based on the image signal.

The light modulator 20 includes the light incident-side polarizer 21, one liquid crystal panel 22, a light exiting-side polarizer 23, the light incident-side multi-lens array 24 provided on a light incident side of the liquid crystal panel 22, and a light refractor array 25 provided on a light exiting surface of the liquid crystal panel 22. The light incident-side polarizer 21 transmits and enters the linearly-polarized light in the predetermined direction of the white light LW into the liquid crystal panel 22 side. The light incident-side polarizer 21 and the light exiting-side polarizer 23 are placed so that the polarization axis of the light incident-side polarizer 21 and the polarization axis of the light exiting-side polarizer 23 are orthogonal to each other.

The projection optical device 30 includes a projection lens, and projects the light output from the light modulator 20 on a projected surface such as a screen and displays a predetermined image. The number of the projection lenses forming the projection optical device 30 is not particularly limited, but may be one or more.

Figure 2:
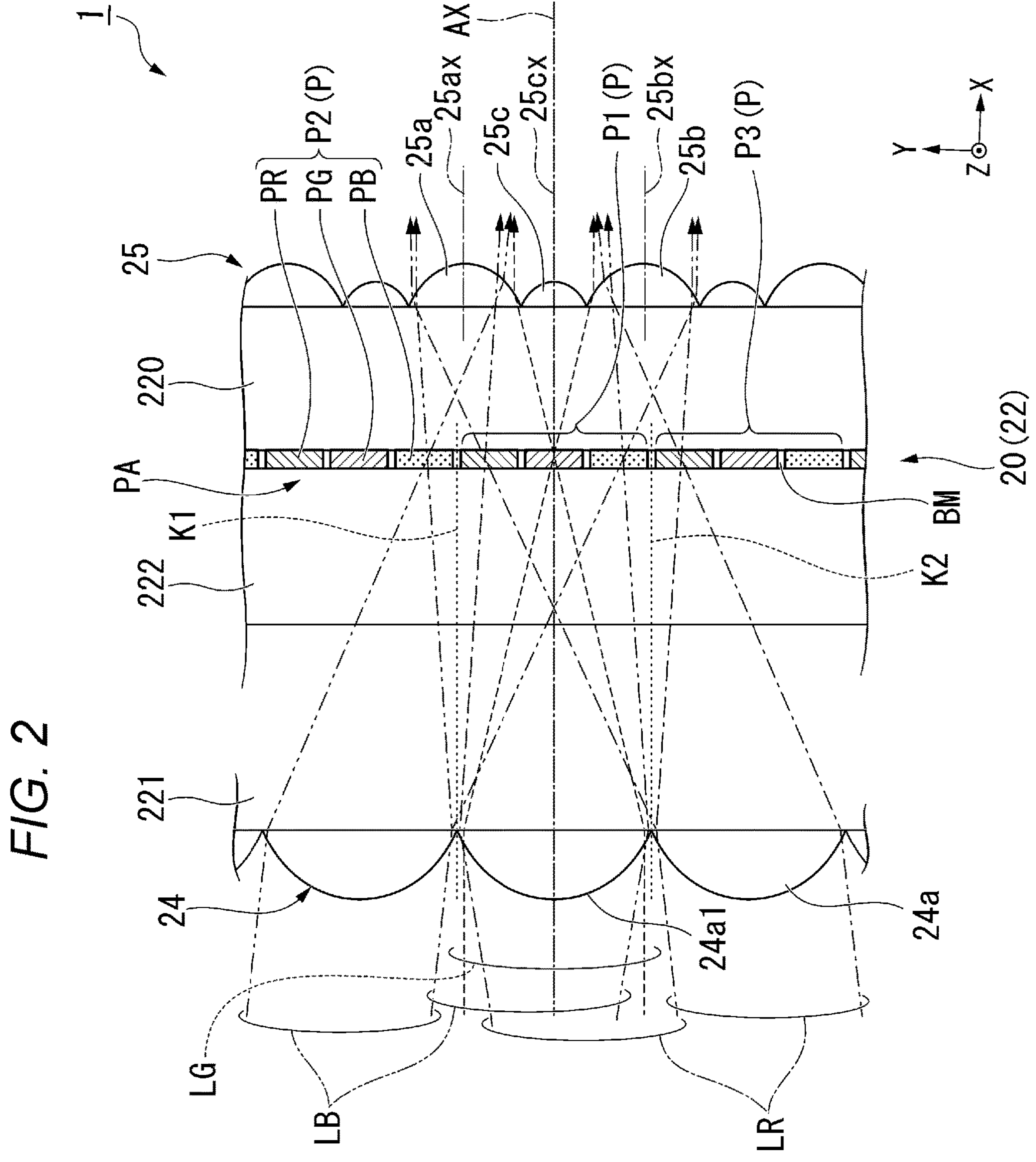
FIG. 2 is a sectional view showing a configuration of a main part of a liquid crystal panel.

FIG. 2 is a sectional view showing a main part of the liquid crystal panel 22.

As shown in FIG. 2, the liquid crystal panel 22 includes an element substrate 220, a counter substrate 221, and a liquid crystal layer 222. The liquid crystal panel 22 includes a pixel area PA having a plurality of pixels P. The plurality of pixels P are arranged in a matrix form in the horizontal directions of the pixel area PA, i.e., the Y directions as the lateral directions and the vertical directions of the pixel area PA, i.e., the Z directions as the longitudinal directions.

The plurality of pixels P contain a first pixel P1, a second pixel P2, and a third pixel P3. In the embodiment, the first pixel P1, the second pixel P2, and the third pixel P3 are three pixels adjacently placed in the Y directions of the plurality of pixels P. The second pixel P2, the first pixel P1, and the third pixel P3 are sequentially arranged in the Y directions.

Specifically, the first pixel P1 is the pixel between the second pixel P2 and the third pixel P3, the second pixel P2 is the pixel adjacent to the first pixel P1 at the +Y side, and the third pixel P3 is the pixel adjacent to the first pixel P1 at the −Y side.

Each pixel P includes a first sub-pixel PR, a second sub-pixel PG, and a third sub-pixel PB. Hereinafter, the first sub-pixel PR, the second sub-pixel PG, and the third sub-pixel PB may be simply abbreviated as sub-pixels PR, PG, PB.

In each pixel P, the respective sub-pixels PR, PG, PB are arranged in the Y directions. The first sub-pixel PR is located at the most +Y side within the pixel P, the second sub-pixel PG is adjacently placed at the −Y side of the first sub-pixel PR, and the third sub-pixel PB is adjacently placed at the −Y side of the second sub-pixel PG. In the embodiment, the Y direction corresponds to "first direction".

As will be described later, the red light LR enters the first sub-pixel PR, the green light LG enters the second sub-pixel PG, and the blue light LB enters the third sub-pixel PB.

The liquid crystal panel 22 of the embodiment has the so-called striped pixel area PA. Specifically, in the pixel area PA, the respective sub-pixels PR, PG, PB of the pixels P adjacent in the Z directions are arranged in the Z directions. The respective sub-pixels PR, PG, PB are areas sectioned by a black matrix BM as a light-shielding member. The liquid crystal panel 22 generates an image light with desired brightness by adjusting applied voltages to the liquid crystal layers 222 placed in the respective sub-pixels PR, PG, PB based on the image signal.

The light incident-side multi-lens array 24 is provided at a light incident side of the counter substrate 221 of the liquid crystal panel 22. The light incident-side multi-lens array 24 has the plurality of lenses 24*a* provided to correspond to the respective pixels P. Note that the light incident-side multi-lens array 24 may be separately formed by attachment to the counter substrate 221 via a bonding layer or integrally formed with the counter substrate 221.

In the embodiment, the light incident-side multi-lens array 24 corresponds to "multi-lens array".

As shown in FIG. 2, in the projector 1 of the embodiment, the red light LR, the green light LG, and the blue light LB enter each lens 24*a* of the light incident-side multi-lens array 24 at different angles in the Y directions. The red light LR enters in an oblique direction from the −Y side toward the +Y side with respect to the lens optical axis of each lens 24*a*, the green light LG enters in the +X direction along the lens optical axis of each lens 24*a*, and the blue light LB enters in an oblique direction from the +Y side toward the −Y side with respect to the lens optical axis of each lens 24*a*. The differences in incident angle of the respective color lights LR, LG, LB in a light incident surface 24*a*1 of each lens 24*a* of the light incident-side multi-lens array 24 are reflected on differences in incident position within the respective sub-pixels PR, PG, PB of the liquid crystal panel 22.

Thereby, each lens 24*a* of the light incident-side multi-lens array 24 collects the red light LR entering from the oblique direction on the first sub-pixel PR of each pixel P, collects the green light LG entering in parallel on the second sub-pixel PG of each pixel P, and collects the blue light LB entering from the oblique direction opposite to the red light LR with respect to the green light LG on the third sub-pixel PB. Note that "collect" in this specification does not necessarily collect the lights to single points of the respective sub-pixels PR, PG, PB, but, even in a defocus condition, may collect the lights within the respective sub-pixels PR, PG, PB to some degree to make larger amounts of lights pass through the respective sub-pixels.

The respective color lights LR, LG, LB modulated in the respective sub-pixels PR, PG, PB enter the light refractor array 25 provided at the light exiting side of the liquid crystal panel 22. The light refractor array 25 has a plurality of light refractors. The plurality of light refractors include a first light refractor 25*a*, a second light refractor 25*b*, and a third light refractor 25*c*.

The first light refractor 25*a* is placed over a boundary between the first pixel P1 and the second pixel P2. The boundary between the first pixel P1 and the second pixel P2 is defined by a first boundary line K1 shown by an imaginary line along the X directions that separates the two pixels in the Y directions.

The second light refractor 25*b* is placed over a boundary between the first pixel P1 and the third pixel P3. The boundary between the first pixel P1 and the third pixel P3 is defined by a second boundary line K2 shown by an imaginary line along the X directions that separates the two pixels in the Y directions.

The third light refractor 25*c* is placed between the first light refractor 25*a* and the second light refractor 25*b*.

Hereinafter, the first light refractor 25*a*, the second light refractor 25*b*, and the third light refractor 25*c* may be collectively simply referred to as "respective light refractors 25*a*, 25*b*, 25*c*".

The plurality of light refractors including the respective light refractors 25*a*, 25*b*, 25*c* are formed using convex lenses. The respective light refractors 25*a*, 25*b*, 25*c* are lenses having symmetrical shapes with respect to lens optical axes. In the case of the embodiment, the first light refractor 25*a* and the second light refractor 25*b* are formed using the same convex lens and the third light refractor 25*c* is formed using the convex lens smaller than those of the first light refractor 25*a* and the second light refractor 25*b*. Note that the lenses forming the respective light refractors 25*a*, 25*b*, 25*c* may be spherical lenses or aspherical lenses.

Here, a configuration of a comparative example is taken as an example for explanation.

Figure 3:
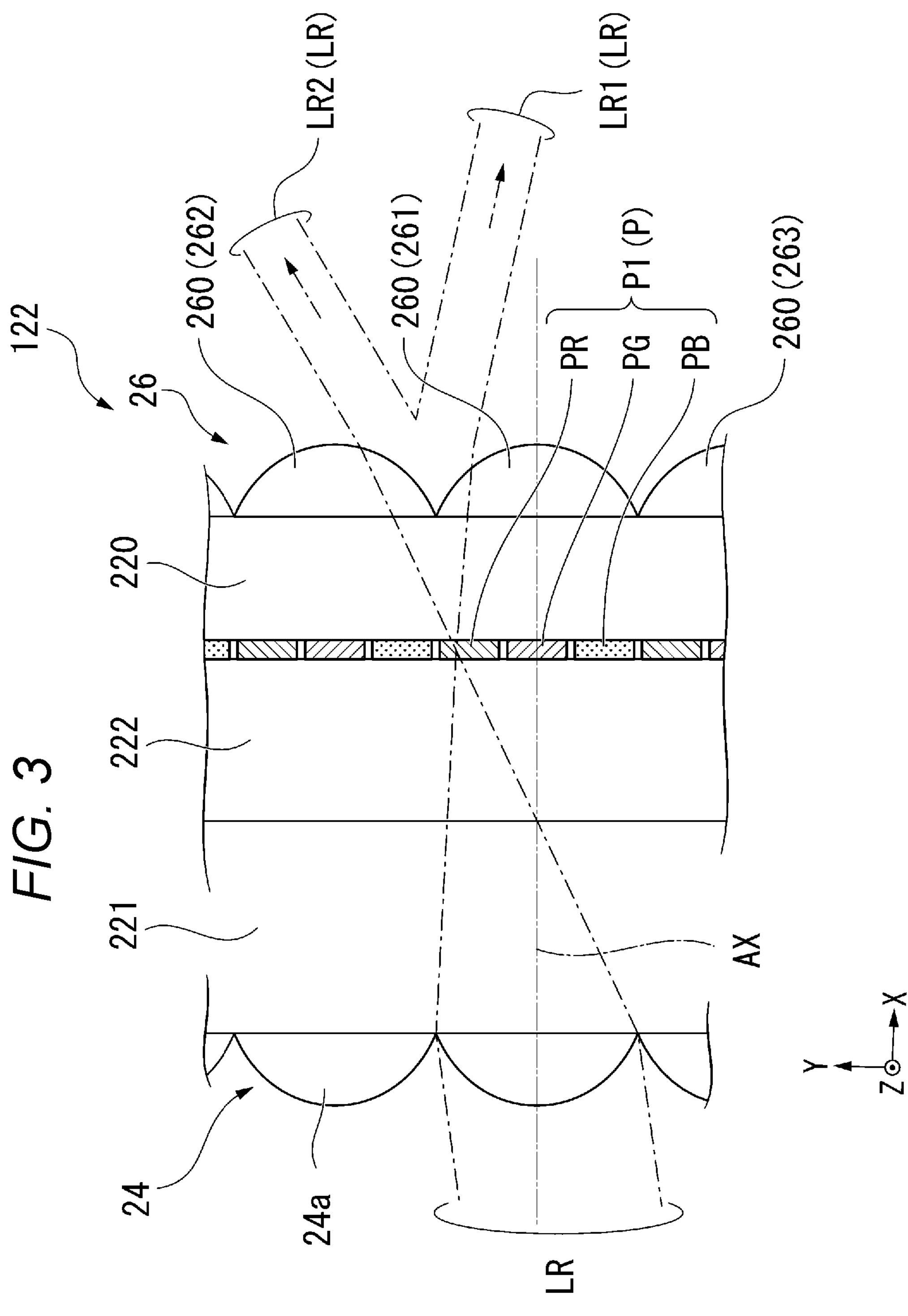
FIG. 3 shows a configuration of a main part of a liquid crystal panel of a comparative example.

FIG. 3 shows a configuration of a main part of a liquid crystal panel of the comparative example. As shown in FIG. 3, a liquid crystal panel 122 of the comparative example is different from the configuration of the embodiment in that a light exiting-side multi-lens array 26 forming a pair with the light incident-side multi-lens array 24 is placed at the light incident side of the liquid crystal panel in place of the light refractor array 25. Note that the common configurations with the embodiment except the light exiting-side multi-lens array 26 will be explained with the same signs.

In the liquid crystal panel 122 of the comparative example, the light exiting-side multi-lens array 26 has the same configuration as the light incident-side multi-lens array 24. Specifically, the light exiting-side multi-lens array 26 has a plurality of lenses 260 provided to correspond to the respective pixels P and the respective lenses 260 are placed to form pairs with the respective lenses 24*a* of the light incident-side multi-lens array 24. In the following description, of the plurality of lenses 260, a lens corresponding to the first pixel P1 of the liquid crystal panel 122 may be referred to as "first lens 261", a lens corresponding to the second pixel P2 of the liquid crystal panel 122 may be referred to as "second lens 262", and a lens corresponding to the third pixel P3 of the liquid crystal panel 122 may be referred to as "third lens 263".

A part or a larger part of the red light LR enters the first lens 261 corresponding to the first pixel P1 from the first sub-pixel PR of the first pixel P1. A first component LR1 entering the first lens 261 of the red light LR is transmitted through the first lens 261 and deflected in a direction along the principal optical axis AX of the projector passing through the center of the liquid crystal panel 122. Accordingly, the first component LR1 of the red light LR transmitted through the first lens 261 and deflected in the direction along the principal optical axis AX is efficiently transmitted through the projection optical device 30 located downstream of the liquid crystal panel 122 and projected as an image light.

On the other hand, the red light LR is output with a predetermined spread, and a component spreading toward the second pixel P2 side of the red light LR enters, not the first lens 261, but the second lens 262 corresponding to the second pixel P2. A second component LR2 of the red light LR entering the second lens 262 is transmitted through the second lens 262 and deflected in a direction away from the principal optical axis AX of the projector. Accordingly, the second component LR2 of the red light LR transmitted through the second lens 262 and deflected in a direction away from the principal optical axis AX may not be efficiently transmitted through the projection optical device 30 located downstream of the liquid crystal panel 122.

As described above, in the liquid crystal panel 122 of the comparative example, a part of the red light LR may not enter the projection optical device 30 from the first sub-pixel PR of the first pixel P1 and the light of the light source device 10 may not be efficiently used as an image light.

Further, like the red light LR output from the first sub-pixel PR of the first pixel P1, a part of the blue light LB output from the third sub-pixel PB of the first pixel P1 enters the third lens 263 corresponding to the third pixel P3 adjacent at the −Y side of the first pixel P1 and is deflected in a direction away from the principal optical axis AX of the projector, and thereby, may not enter the projection optical device 30.

Note that, in the above description, the first pixel P1, the second pixel P2, and the third pixel P3 are taken as an example, however, the same applies to the adjacent three pixels P in the other pixel P.

Therefore, in the configuration of the comparative example, it is difficult to efficiently use the light of the light source device 10 as an image light.

On the other hand, in the projector 1 of the embodiment, as shown in FIG. 2, the red light LR output from the first sub-pixel PR of the first pixel P1 and the blue light LB output from the third sub-pixel PB of the second pixel P2 enter the first light refractor 25*a* placed over the boundary between the first pixel P1 and the second pixel P2. Further, the blue light LB output from the third sub-pixel PB of the first pixel P1 and the red light LR output from the first sub-pixel PR of the third pixel P3 enter the second light refractor 25*b* placed over the boundary between the first pixel P1 and the third pixel P3.

The first sub-pixel PR of the first pixel P1 and the third sub-pixel PB of the second pixel P2 are placed in positions substantially symmetrically to each other with respect to the boundary between the first pixel P1 and the second pixel P2. Accordingly, the incident direction of the red light LR to the first light refractor 25*a* from the first sub-pixel PR of the first pixel P1 and the incident direction of the blue light LB to the first light refractor 25*a* from the third sub-pixel PB of the second pixel P2 are substantially symmetrical to each other with respect to the boundary between the first pixel P1 and the second pixel P2.

The first light refractor 25*a* deflects the red light LR output from the first sub-pixel PR of the first pixel P1 and entering in the oblique direction from the −Y side toward the +Y side toward the −Y side with respect to a lens optical axis 25*ax* and deflects the blue light LB output from the third sub-pixel PB of the second pixel P2 and entering in the oblique direction from the +Y side toward the −Y side toward the +Y side with respect to the lens optical axis 25*ax*.

Thereby, the first light refractor 25*a* can deflect the red light LR and the blue light LB in the direction along the principal optical axis AX of the projector 1 passing through the center of the liquid crystal panel 122.

Further, the third sub-pixel PB of the first pixel P1 and the first sub-pixel PR of the third pixel P3 are placed in positions substantially symmetrically to each other with respect to the boundary between the first pixel P1 and the third pixel P3. Accordingly, the incident direction of the blue light LB to the second light refractor 25*b* from the third sub-pixel PB of the first pixel P1 and the incident direction of the red light LR to the second light refractor 25*b* from the first sub-pixel PR of the third pixel P3 are substantially symmetrical to each other with respect to the boundary between the first pixel P1 and the third pixel P3.

The second light refractor 25*b* deflects the blue light LB output from the third sub-pixel PB of the first pixel P1 and entering in the oblique direction from the +Y side toward the −Y side toward the +Y side with respect to a lens optical axis 25*bx* and deflects the red light LR output from the first sub-pixel PR of the third pixel P3 and entering in the oblique direction from the −Y side toward the +Y side toward the −Y side with respect to the lens optical axis 25*bx*.

Thereby, the second light refractor 25*b* can deflect the red light LR and the blue light LB in the direction along the principal optical axis AX of the projector 1 passing through the center of the liquid crystal panel 122.

In the embodiment, the lens optical axis 25*ax* of the first light refractor 25*a* is placed on the first boundary line K1 between the first pixel P1 and the second pixel P2 in the X directions orthogonal to the Y directions, in which the light incident-side multi-lens array 24, the liquid crystal panel 22, and the light refractor array 25 are arranged. In the embodiment, the X direction corresponds to "second direction".

According to the configuration, the first light refractor 25*a* can apply deflection forces at the same level to the red light LR entering from the first sub-pixel PR of the first pixel P1 and the blue light LB entering from the third sub-pixel PB of the second pixel P2.

The lens optical axis 25*bx* of the second light refractor 25*b* is placed on the second boundary line K2 between the first pixel P1 and the third pixel P3 in the X directions.

According to the configuration, the second light refractor 25*b* can apply deflection forces at the same level to the blue light LB entering from the third sub-pixel PB of the first pixel P1 and the red light LR entering from the first sub-pixel PR of the third pixel P3.

A lens optical axis 25*cx* of the third light refractor 25*c* is placed on the center of the second sub-pixel PG of the first pixel P1 in the X directions.

According to the configuration, the third light refractor 25*c* can output the green light LG in the direction along the principal optical axis AX of the projector 1 by balancing application of a deflection force to the green light LG entering from the second sub-pixel PG of the first pixel P1 in the Y directions.

Note that the width of the third light refractor 25*c* in the Y directions is set to a dimension that can accommodate the green light LG spreading and entering from the second sub-pixel PG. If the width of the third light refractor 25*c* in the Y directions is smaller than the spread width of the green light LG, the green light LG enters an interface portion between the first light refractor 25*a* and the second light refractor 25*b* and an interface portion between the first light refractor 25*a* and the third light refractor 25*c*. An abrupt angle change occurs in the interface portion between these two light refractors, and the light entering the interface portion may be totally reflected or deflected in a direction largely away from the principal optical axis AX and not enter the projection optical device 30.

As described above, the projector 1 of the embodiment includes the light source device 10 outputting the white light LW containing the red light LR, the green light LG, and the blue light LB different in color from one another, the light modulator 20 modulating the red light LR, the green light LG, and the blue light LB output from the light source device 10 based on the image signal, and the projection optical device 30 projecting the light output from the light modulator 20. The light modulator 20 has one liquid crystal panel 22, the light incident-side multi-lens array 24 provided at the light incident side of the liquid crystal panel 22 and entered by the red light LR, the green light LG, and the blue light LB respectively output from the light source device 10 at the different angles, and the light refractor array 25 provided at the light exiting side of the liquid crystal panel 22. The liquid crystal panel 22 has the plurality of pixels P containing the first pixel P1, the second pixel P2, and the third pixel P3. Each of the plurality of pixels P has the first sub-pixel PR entered by the red light LR collected by the light incident-side multi-lens array 24, the second sub-pixel PG adjacently placed in the Y direction of the first sub-pixel PR and entered by the green light LG collected by the light incident-side multi-lens array 24, and the third sub-pixel PB adjacently placed in the Y direction of the second sub-pixel PG and entered by the blue light LB collected by the light incident-side multi-lens array 24. The light incident-side multi-lens array 24 has the plurality of lenses 24*a* provided to correspond to each of the plurality of pixels P and respectively entered by the red light LR, the green light LG, and the blue light LB at the different angles. The light refractor array 25 has the first light refractor 25*a* placed over the first boundary line K1 between the first pixel P1 and the second pixel P2 adjacent at the +Y side of the first pixel P1 of the plurality of pixels P, and the second light refractor 25*b* placed over the second boundary line K2 between the first pixel P1 and the third pixel P3 adjacent at the −Y side of the first pixel P1. The red light LR output from the first sub-pixel PR of the first pixel P1 and the blue light LB output from the third sub-pixel PB of the second pixel P2 enter the first light refractor 25*a*. The blue light LB output from the third sub-pixel PB of the first pixel P1 and the red light LR output from the first sub-pixel PR of the third pixel P3 enter the second light refractor 25*b*.

Further, the light refractor array 25 further has the third light refractor 25*c* placed between the first light refractor 25*a* and the second light refractor 25*b* in the Y direction and entered by the green light LG, and the green light LG output from the second sub-pixel PG of the first pixel P1 enters the third light refractor 25*c*.

According to the projector 1 of the embodiment, the light refractor array 25 having the respective light refractors 25*a*, 25*b*, 25*c* is provided, and the red light LR, the green light LG, and the blue light LB output from each pixel P of the liquid crystal panel 22 may be deflected in the direction along the principal optical axis AX, efficiently transmitted through the projection optical device 30, and can be effectively used as the image light.

Second Embodiment

Subsequently, a configuration of a projector of a second embodiment will be explained.

The basic configuration of the projector of the second embodiment is the same that of the first embodiment, but the second embodiment is different from the first embodiment in the configuration of the light refractor array. As below, the explanation of the common parts with the first embodiment will be omitted and the common members and configurations with the first embodiment will be explained with the same signs.

Figure 4:
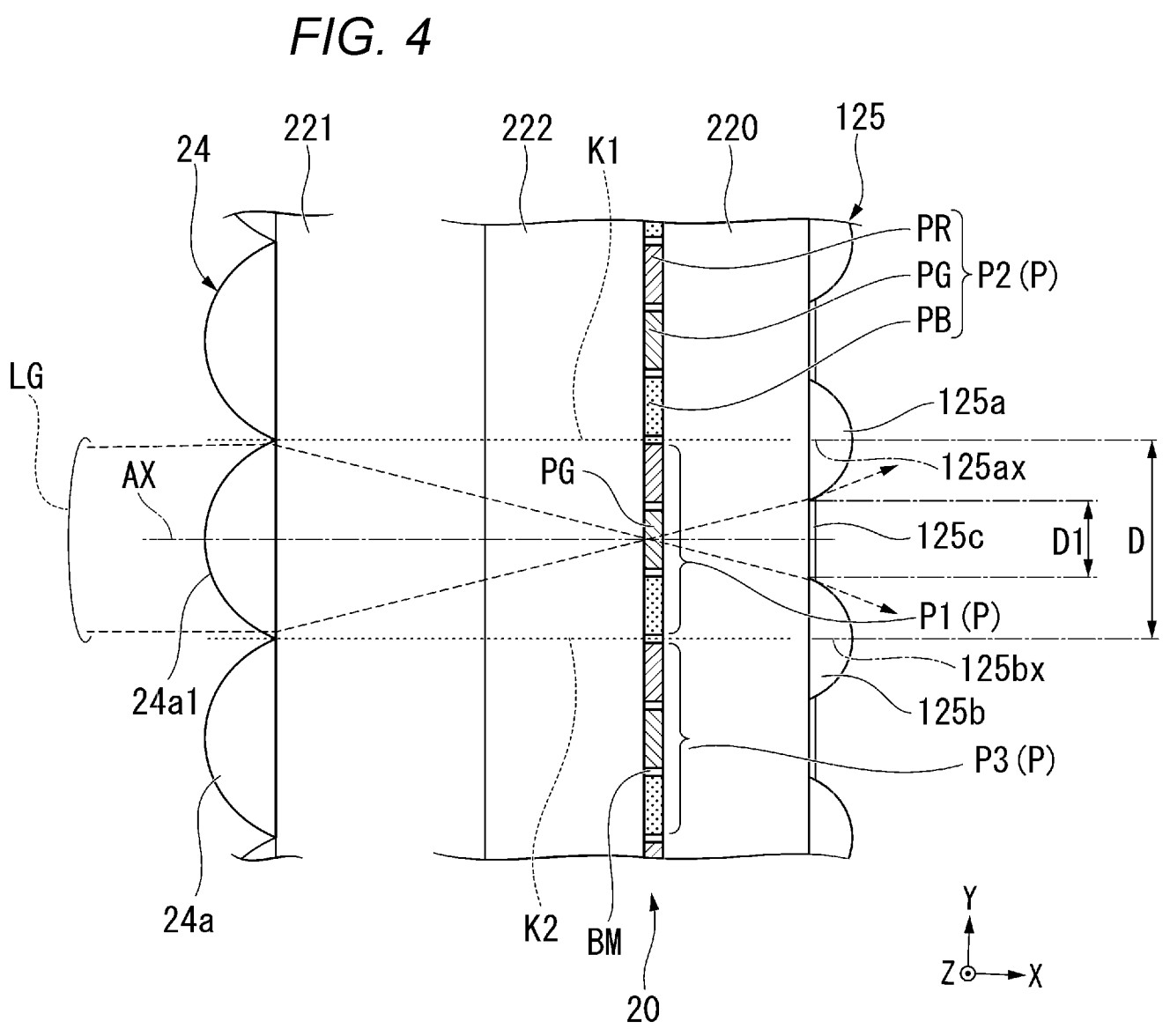

FIG. 4 is a sectional view showing a main part of a liquid crystal panel in the projector of the embodiment. Specifically, FIG. 4 shows a configuration of a light refractor array 125 provided at the light exiting side of the liquid crystal panel.

As shown in FIG. 4, the light refractor array 125 of the embodiment has a first light refractor 125*a* and a second light refractor 125*b*, but does not have the third light refractor. In the light refractor array 125, the first light refractor 125*a* and the second light refractor 125*b* are integrally formed via a planar portion 125*c*.

The first light refractor 125*a* is placed on the first boundary line K1 between the first pixel P1 and the second pixel P2, and the second light refractor 125*b* is placed on the second boundary line K2 between the first pixel P1 and the third pixel P3. The first light refractor 125*a* and the second light refractor 125*b* are formed using convex lenses.

A distance between a lens optical axis 125*ax* of the first light refractor 125*a* and a lens optical axis 125*bx* of the second light refractor 125*b* in the Y directions is D, and a width of the planar portion 125*c* in the Y directions is D1. Note that, in other words, D1 may be a distance between an end portion at the side at which the second light refractor 125*b* is placed in the first light refractor 125*a* and an end portion at the side at which the first light refractor 125*a* is placed in the second light refractor 125*b* in the Y directions.

Here, the green light LG output from the second sub-pixel PG located at the center of the first pixel P1 has a predetermined spread, and components of the green light LG on both ends in the Y directions enter the first light refractor 125*a* and the second light refractor 125*b*.

If D1 is larger than 0.5 D, the sizes of the first light refractor 125*a* and the second light refractor 125*b* in the Y directions are smaller and the effects by the provision of the first light refractor 125*a* and the second light refractor 125*b* are smaller.

For the reason, in the case of the embodiment, a relationship between the width D1 of the planar portion 125*c* in the Y directions and the distance D is set to satisfy a relationship of D1≤0.5 D.

According to the light refractor array 125 of the embodiment, the relationship between the width D1 of the planar portion 125*c* in the Y directions and the distance D satisfies D1≤0.5 D and, even when the light refractor array includes the first light refractor 125*a* and the second light refractor 125*b*, the red light LR, the green light LG, and the blue light LB output from each pixel P of the liquid crystal panel 22 can be efficiently transmitted through the projection optical device 30.

Further, when 0<D1≤0.5 D, the light refractor array 125 has the planar portion 125*c* between the first light refractor 125*a* and the second light refractor 125*b*, and that contributes to increase in brightness of the image light output from the projection optical device 30. Particularly, when the planar portion 125*c* faces the second sub-pixel PG, that is, when the green light LG output from the second sub-pixel PG enters the planar portion 125*c*, the contribution to the increase in brightness of the image light projected by the projection optical device 30 is larger because green is a color with higher relative luminosity.

Note that, in the relationship of D1≤0.5 D, as is the case with D1≤0, the red light LR, the green light LG, and the blue light LB output from each pixel P of the liquid crystal panel 22 can be efficiently transmitted through the projection optical device 30. The case where D1≤0 is e.g., a case where an end portion of the first light refractor 125*a* and an end portion of the second light refractor 125*b* contact each other or a case where one end portion overlaps with the other light refractor. In this case, there is no planar portion 125*c* between the first light refractor 125*a* and the second light refractor 125*b*.

Third Embodiment

Subsequently, a configuration of a projector of a third embodiment will be explained.

The basic configuration of the projector of the third embodiment is the same as that of the first embodiment, but the t embodiment is different from the first embodiment in the configuration of the light refractor array. As below, the explanation of the common parts with the first embodiment will be omitted and the common members and configurations with the first embodiment will be explained with the same signs.

Figure 5:
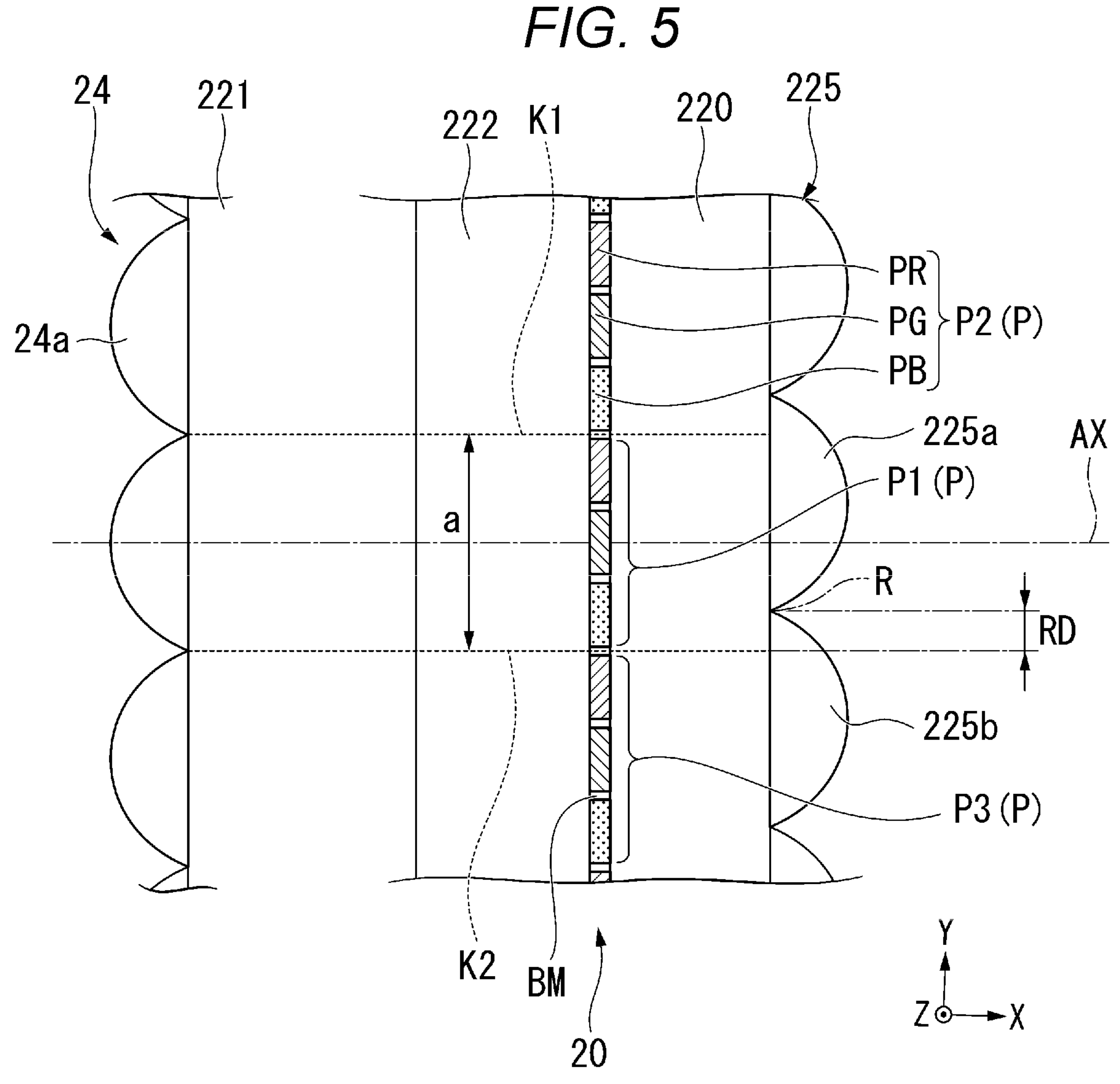
FIG. 5 shows a configuration of a light refractor array of a third embodiment.

FIG. 5 is a sectional view showing a main part of a liquid crystal panel in the projector of the embodiment. Specifically, FIG. 5 shows a configuration of a light refractor array 225 provided at the light exiting side of the liquid crystal panel.

As shown in FIG. 5, a plurality of light refractors forming the light refractor array 225 of the embodiment include a first light refractor 225*a* and a second light refractor 225*b*. Hereinafter, the first light refractor 225*a* and the second light refractor 225*b* may be collectively simply referred to as "respective light refractors 225*a*, 225*b*".

The plurality of light refractors including the respective light refractors 225*b* have the same configurations as the respective lenses 24*a* of the light incident-side multi-lens array 24. That is, the light refractor array 225 of the embodiment is the same member as the light incident-side multi-lens array 24 and the respective light refractors 225*a*, 225*b* are formed using lenses placed at an equal pitch to the arrangement pitch of the respective lenses 24*a* in the light incident-side multi-lens array 24. In the embodiment, the light refractors 225*a*, 225*b* correspond to arbitrary adjacent two light refractors of the plurality of light refractors arranged in the Y directions.

The respective light refractors 225*a*, 225*b* are placed in different positions from those of the respective lenses 24*a* in the Y directions. Specifically, the convex lens forming the first light refractor 225*a* is placed on the first boundary line K1 between the first pixel P1 and the second pixel P2 and the convex lens forming the second light refractor 225*b* is placed on the second boundary line K2 between the first pixel P1 and the third pixel P3.

In the light refractor array 225 of the embodiment, when the dimension of the pixel P in the Y direction is a, a position of a lens boundary R in the first light refractor 225*a* and the second light refractor 225*b* is displaced by 0.2 a or more and 0.5 a or less with respect to the second boundary line K2 as the boundary between the first pixel P1 and the third pixel P3.

If the displacement is smaller than 0.2 a, the configuration is closer to that of the above described comparative example. That is, the respective color lights LR, LB output from the first sub-pixel PR and the third sub-pixel PB located on ends of each pixel P are deflected in directions away from the principal optical axis AX, and thereby, cannot be efficiently transmitted through the projection optical device 30. Further, when the displacement is larger than 0.5 a, the lights are folded back, and the upper limit is 0.5 a.

According to the light refractor array 225 of the embodiment, as described above, a displacement amount RD of the lens boundary R with respect to the second boundary line K2 satisfies 0.2 a or more and 0.5 a or less. Even when the same member as the light incident-side multi-lens array 24 is used as the light refractor array 225, the red light LR, the green light LG, and the blue light LB output from each pixel P of the liquid crystal panel 22 can be efficiently transmitted through the projection optical device 30.

Note that, in the above description, the position of the lens boundary R with respect to the second boundary line K2 is taken as an example, however, the same applies to a case where a position of the lens boundary R with respect to the first boundary line K1 is used as a reference. In this case, the position of the lens boundary R in the first light refractor 225*a* and the second light refractor 225*b* may be displaced by 0.2 a or more and 0.5 a or less with respect to the first boundary line K1 as the boundary between the first pixel P1 and the second pixel P2. In this case as well, similarly, the red light LR, the green light LG, and the blue light LB output from each pixel P of the liquid crystal panel 22 can be efficiently transmitted through the projection optical device 30.

Fourth Embodiment

Subsequently, a configuration of a projector of a fourth embodiment will be explained.

The basic configuration of the projector of the fourth embodiment is the same as that of the first embodiment, but the fourth embodiment is different from the first embodiment in the configuration of the light refractor array. As below, the explanation of the common parts with the first embodiment will be omitted and the common members and configurations with the first embodiment will be explained with the same signs.

Figure 6:
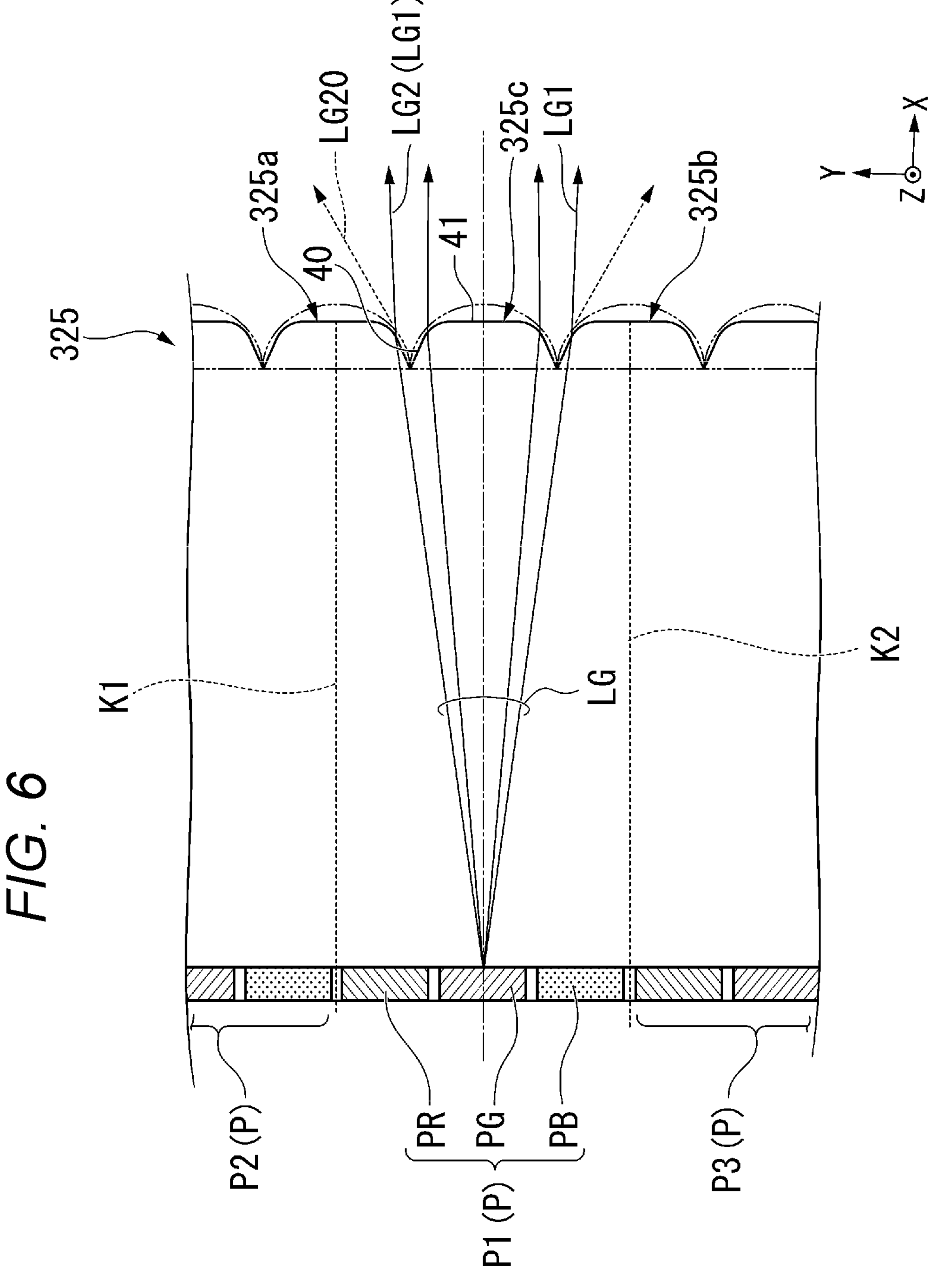
FIG. 6 shows a configuration of a light refractor array of a fourth embodiment.

FIG. 6 is a sectional view showing a main part of a liquid crystal panel in the projector of the embodiment. Specifically, FIG. 6 shows a configuration of a light refractor array 325 provided at the light exiting side of the liquid crystal panel.

As shown in FIG. 6, a plurality of light refractors forming the light refractor array 325 of the embodiment include a first light refractor 325*a*, a second light refractor 325*b*, and a third light refractor 325*c*. The first light refractor 325*a* is placed on the first boundary line K1 between the first pixel P1 and the second pixel P2, and the second light refractor 325*b* is placed on the second boundary line K2 between the first pixel P1 and the third pixel P3. The third light refractor 325*c* is placed between the first light refractor 325*a* and the second light refractor 325*b*.

Hereinafter, the first light refractor 325*a*, the second light refractor 325*b*, and the third light refractor 325*c* may be collectively simply referred to as "respective light refractors 325*a*, 325*b*, 325*c*".

The plurality of light refractors including the respective light refractors 325*a*, 325*b*, 325*c* have truncated cone shapes. As below, the truncated cone shape and effects by the shape will be explained using the first light refractor 325*a* as an example.

The first light refractor 325*a* has the truncated cone shape having an outer shape tapered toward the +X direction away from the liquid crystal panel 22 and an end 41 as a planar surface. That is, the first light refractor 325*a* has the shape deflecting the entering light without a lens function collecting the light. In the case of the embodiment, the respective light refractors 325*a*, 325*b*, 325*c* are integrated.

A side surface 40 of the first light refractor 325*a* is a surface inclined in a direction closer to the principal optical axis AX from the −X side toward the +X side. In the case of the embodiment, the side surface 40 is formed by the planar surface at a base side (−X) and partially formed by a curved surface such as a spherical surface or an aspherical surface toward the end 41 side (+X).

In a plan view of the first light refractor 325*a* from the end 41 side (+X side), the first light refractor 325*a* may have a circular shape or substantially an oval shape having a long axis in the Z directions according to the shape of the pixel P.

As described above, the green light LG output from the second sub-pixel PG located at the center of the first pixel P1 has a predetermined spread, and both-ends components LG1 of the green light LG in the Y directions enter the first light refractor 325*a* and the second light refractor 325*b* and the first light refractor 325*a* and the third light refractor 325*c*.

For example, a part of a one-end component LG2 of the green light LG located at the +Y side enters the first light refractor 325*a* adjacent to the third light refractor 325*c*.

Here, as a comparative example, a case where the respective light refractors 325*a*, 325*b*, 325*c* are formed using spherical lenses is considered. That is, as shown by a dash double-dot line in FIG. 6, a case where the first light refractor 325*a* is formed using a lens is considered.

In this case, a one-end component LG20 of the green light LG is collected by the lens face of the first light refractor 325*a* and largely deflected toward the +Y side farther away from the principal optical axis AX. Accordingly, the projection optical device 30 is hard to take in the one-end component LG20 of the green light LG.

On the other hand, according to the light refractor array 325 of the embodiment, as described above, the respective light refractors 325*a*, 325*b*, 325*c* have the truncated cone shapes, and the side surface 40 has the shape without the lens function. Thereby, even when the one-end component LG2 of the green light LG enters the side surface 40 of the first light refractor 325*a*, the side surface 40 without the lens function slightly refracts the one-end component LG2, but does not largely deflect the traveling direction thereof. Therefore, the defect that the one-end component LG2 of the green light LG is largely deflected toward the +Y side away from the principal optical axis AX and hard to be taken in the projection optical device 30 can be suppressed.

Thus, according to the light refractor array 325 of the embodiment, as described above, the respective light refractors 325*a*, 325*b*, 325*c* having the truncated cone shapes are provided, and thereby, of the color lights output from each pixel P of the liquid crystal panel 22, particularly, the green light LG can be efficiently transmitted through the projection optical device 30.

Fifth Embodiment

Subsequently, a configuration of a projector of a fifth embodiment will be explained.

The projector of the fifth embodiment is different from the first embodiment in the configuration of the light source device. As below, the explanation of the common parts with the first embodiment will be omitted and the common members and configurations with the first embodiment will be explained with the same signs.

Figure 7:
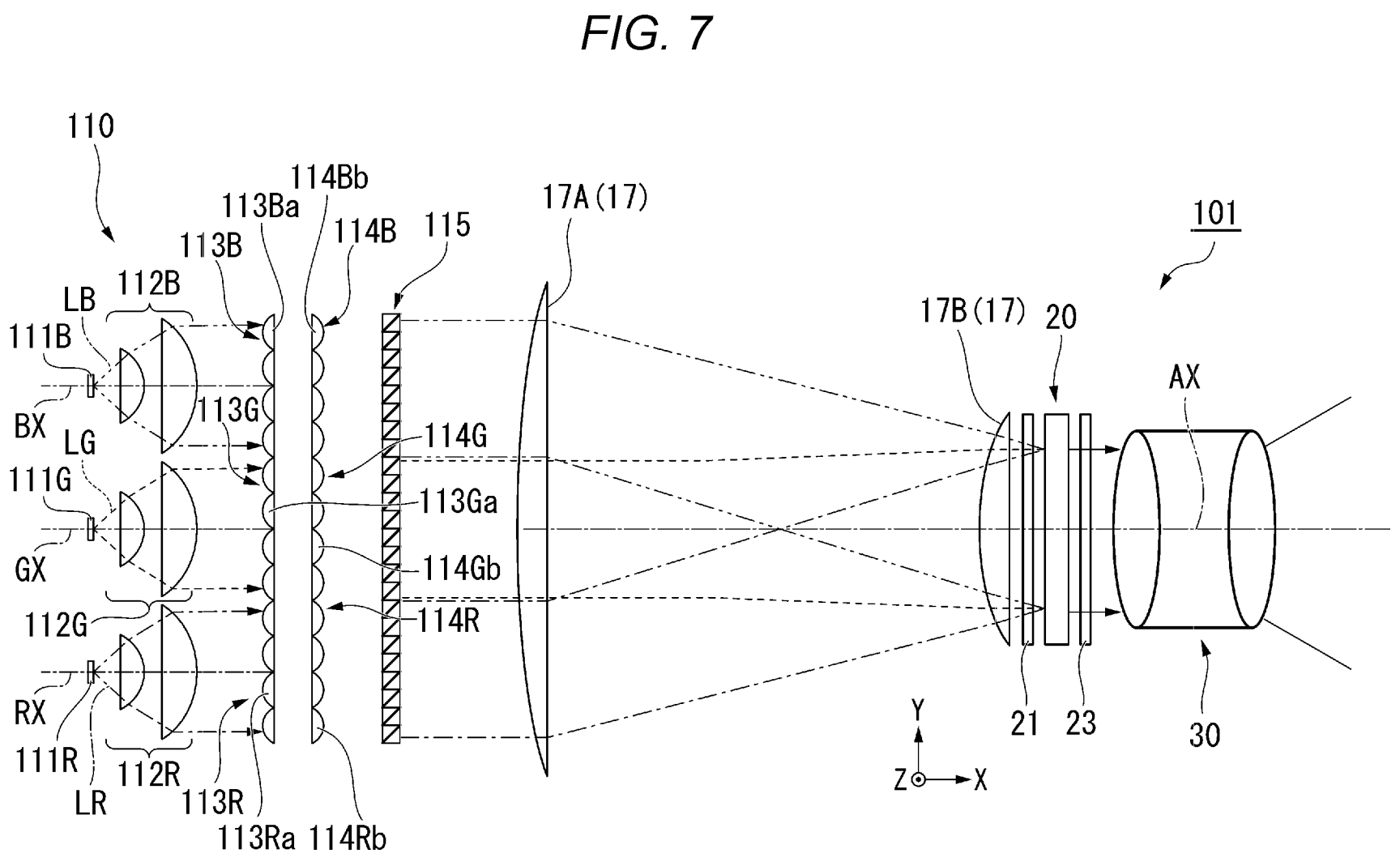

FIG. 7 is a schematic configuration diagram of the projector of the embodiment.

As shown in FIG. 7, a projector 101 of the embodiment includes a light source device 110, the light modulator 20, and the projection optical device 30.

The light source device 110 includes a first light source 111R, a second light source 111G, a third light source 111B, a first collimator system 112R, a second collimator system 112G, a third collimator system 112B, a first lens array for red light 113R, a first lens array for green light 113G, a first lens array for blue light 113B, a second lens array for red light 114R, a second lens array for green light 114G, a second lens array for blue light 114B, a polarization conversion element 115, and the superimposition system 17.

The first light source 111R includes a red LED and outputs the red light LR. The second light source 111G includes a green LED and outputs the green light LG. The third light source 111B includes a blue LED and outputs the blue light LB.

The first light source 111R, the second light source 111G, and the third light source 111B are sequentially placed from the −Y side toward the +Y side in the Y direction orthogonal to the principal optical axis AX.

The first collimator system 112R parallelizes and guides the red light LR emitted from the first light source 111R to the first lens array for red light 113R. The second collimator system 112G parallelizes and guides the green light LG emitted from the second light source 111G to the first lens array for green light 113G. The third collimator system 112B parallelizes and guides the blue light LB emitted from the third light source 111B to the first lens array for blue light 113B.

The first lens array for red light 113R has a plurality of lenses 113Ra arranged in a matrix form within a plane orthogonal to an illumination optical axis RX of the first light source 111R. The first lens array for red light 113R divides the red light LR entering from the first light source 111R into a plurality of partial luminous fluxes by the plurality of lenses 113Ra.

The first lens array for green light 113G has a plurality of lenses 113Ga arranged in a matrix form within a plane orthogonal to an illumination optical axis GX of the second light source 111G. The first lens array for green light 113G divides the green light LG entering from the second light source 111G into a plurality of partial luminous fluxes by the plurality of lenses 113Ga.

The first lens array for blue light 113B has a plurality of lenses 113Ba arranged in a matrix form within a plane orthogonal to an illumination optical axis BX of the third light source 111B. The first lens array for blue light 113B divides the blue light LB entering from the third light source 111B into a plurality of partial luminous fluxes by the plurality of lenses 113Ba.

In the embodiment, the first lens array for red light 113R, the first lens array for green light 113G, and the first lens array for blue light 113B may be integrally formed or separately formed.

The second lens array for red light 114R has a plurality of lenses 114Rb arranged in a matrix form within the plane orthogonal to the illumination optical axis RX of the first light e 111R and corresponding to the plurality of lenses 113Ra of the first lens array for red light 113R. Into each lens 114Rb, the partial luminous flux output from the lens 113Ra corresponding to the lens 114Rb is entered. Each lens 114Rb enters the partial luminous flux into the polarization conversion element 115.

The second lens array for green light 114G has a plurality of lenses 114Gb arranged in a matrix form within the plane orthogonal to the illumination optical axis GX of the second light source 111G and corresponding to the plurality of lenses 113Ga of the first lens array for green light 113G. Into each lens 114Gb, the partial luminous flux output from the lens 113Ga corresponding to the lens 114Gb is entered. Each lens 114Gb enters the partial luminous flux into the polarization conversion element 115.

The second lens array for blue light 114B has a plurality of lenses 114Bb arranged in a matrix form within the plane orthogonal to the illumination optical axis BX of the third light source 111B and corresponding to the plurality of lenses 113Ba of the first lens array for blue light 113B. Into each lens 114Bb, the partial luminous flux output from the lens 113Ba corresponding to the lens 114Bb is entered. Each lens 114Bb enters the partial luminous flux into the polarization conversion element 115.

The polarization conversion element 115 of the embodiment has a width that can accommodate the respective color lights from the second lens array for red light 114R, the second lens array for green light 114G, and the second lens array for blue light 114B in the Y directions.

As described above, unlike the light source device 10 of the first embodiment, the light source device 110 of the embodiment individually includes the first light source 111R, the second light source 111G, and the third light source 111B, and thereby, can enter the light containing the red light LR, the green light LG, and the blue light LB different in color from one another into the superimposition system 17. That is, the light source device 110 enters the red light LR, the green light LG, and the blue light LB into different locations on the light incident surface of the superimposing lens 17A of the superimposition system 17.

According to the configuration, the projector 101 of the embodiment can enter the red light LR, the green light LG, and the blue light LB into each lens 24*a* of the light incident-side multi-lens array 24, which will be described later, provided in the light modulator 20 at different angles in the Y directions.

Note that the other configurations are common with the projector 1 of the first embodiment and the explanation thereof will be omitted.

Like the projector 1 of the first embodiment, in the projector 101 of the embodiment, the light refractor array 25 is provided on the light exiting side of the liquid crystal panel 22, and thereby, the red light LR, the green light LG, and the blue light LB output from each pixel P of the liquid crystal panel 22 may be efficiently transmitted through the projection optical device 30 and can be effectively used as the image light.

Note that the technical scope of the present disclosure is not limited to the above described embodiments, but various changes can be made without departing from the scope of the present disclosure.

In addition, the specific configurations including the numbers, placements, shapes, and materials of the various component elements forming the projector are not limited to those of the above described embodiments, but can be appropriately changed.

As below, the summary of the present disclosure will be appended.

Appendix 1

A projector includes a light source device outputting a light containing a first color light, a second color light, and a third color light different in color from one another, a light modulator modulating the first color light, the second color light, and the third color light output from the light source device based on an image signal, and a projection optical device projecting the light output from the light modulator, wherein the light modulator has one liquid crystal panel, a multi-lens array provided at a light incident side of the liquid crystal panel and respectively entered by the first color light, the second color light, and the third color light output from the light source device at different angles, and a light refractor array provided at a light exiting side of the liquid crystal panel, the liquid crystal panel has a plurality of pixels containing a first pixel, a second pixel, and a third pixel, each of the plurality of pixels has a first sub-pixel entered by the first color light collected by the multi-lens array, a second sub-pixel placed adjacent to the first sub-pixel in a first direction and entered by the second color light collected by the multi-lens array, and a third sub-pixel placed adjacent to the second sub-pixel in the first direction and entered by the third color light collected by the multi-lens array, the multi-lens array has a plurality of lenses provided to correspond to each of the plurality of pixels and respectively entered by the first color light, the second color light, and the third color light at different angles, the light refractor array has a first light refractor placed over a boundary between the first pixel and the second pixel adjacent to the first pixel at one side in the first direction of the plurality of pixels, and a second light refractor placed over a boundary between the first pixel and the third pixel adjacent to the first pixel at the other side in the first direction, the first color light output from the first sub-pixel of the first pixel and the third color light output from the third sub-pixel of the second pixel enter the first light refractor, and the third color light output from the third sub-pixel of the first pixel and the color light output from the first sub-pixel of the third pixel enter the second light refractor.

According to the projector having the configuration, the light refractor array having the first light refractor and the second light refractor is provided, and the first light and the third color light output from each pixel of the liquid crystal panel may be deflected in a direction along a principal optical axis of the projector, efficiently entered into the projection optical device, and can be effectively used as the image light.

Appendix 2

The projector according to Appendix 1, wherein the light refractor array further has a third light refractor provided between the first light refractor and the second light refractor in the first direction and entered by the second color light, and the second color light output from the second sub-pixel of the first pixel enters the third light refractor.

According to the configuration, the third light refractor 25*c* is provided, and thereby, the spread of the second color light output from the second sub-pixel of the first pixel may be suppressed and the second color light can be efficiently transmitted through the projection optical device 30.

Appendix 3

In the projector according to Appendix 1, each of the first light refractor and the second light refractor includes lenses arranged at an equal pitch to an arrangement pitch of the lenses in the multi-lens array, and a position of a lens boundary in the first light refractor and the second light refractor is displaced by 0.2 a or more and 0.5 a or less with respect to a boundary between the first pixel and the second pixel or a boundary between the first pixel and the third pixel, where a dimension of the pixel in the first direction is a.

When the displacement is smaller than 0.2 a, the respective color lights output from the first sub-pixel and the third sub-pixel located on both ends of each pixel are deflected in the directions away from the principal optical axis of the projector, and thereby, the lights are hard to enter the projection optical device. Further, when the displacement is larger than 0.5 a, the lights are folded back, and the upper limit is 0.5 a.

On the other hand, when the displacement satisfies 0.2 a or more and 0.5 a or less, even in a case where the same member as the multi-lens array is used as the light refractor array, the respective color lights output from each pixel of the liquid crystal panel can be efficiently transmitted through the projection optical device.

Appendix 4

In the projector according to Appendix 1, $D1 \leq 0.5$ D, where a distance between an optical axis of the first light refractor and an optical axis of the second light refractor is D, and a distance between an end portion at the second light refractor side of the first light refractor and an end portion at the first light refractor side of the second light refractor is D1.

For the distance D between the optical axis of the first light refractor and the optical axis of the second light refractor, the distance D1 between the end portion at the second light refractor side of the first light refractor and the end portion at the first light refractor side of the second light refractor is set to $D1 \leq 0.5$ D, and thereby, the red light, the green light, and the blue light output from each pixel of the liquid crystal panel can be efficiently transmitted through the projection optical device.

Appendix 5

In the projector according to Appendix 4, $D1 > 0$, and the light refractor array has a planar portion between the first light refractor and the second light refractor.

According to the configuration, a degree of deflection in a direction in which a beam angle of the light output from the second sub-pixel becomes larger is relaxed. As a result, transmittance of the projection optical device is improved and that contributes to increase in brightness of the image light output from the projection optical device.

Appendix 6

In the projector according to Appendix 1, the first light refractor is a lens having a symmetrical shape with respect to a lens optical axis, and the lens optical axis of the first light refractor is placed on a boundary line between the first pixel and the second pixel in a second direction orthogonal to the first direction, in which the multi-lens array, the liquid crystal panel, and the light refractor array are arranged.

According to the configuration, the first light refractor can apply deflection forces at the same level to the first color light entering from the first sub-pixel of the first pixel and the third color light entering from the third sub-pixel of the second pixel.

Appendix 7

In the projector according to Appendix 1, each of the first light refractor and the second light refractor has a truncated cone shape having an outer shape tapered from a base portion toward an end portion and a top part of the end portion as a planar surface.

According to the configuration, the respective light refractors having the truncated cone shapes are provided, and thereby, of the color lights output from each pixel of the liquid crystal panel, particularly, the second color light can be efficiently transmitted through the projection optical device.

What is claimed is:

1. A projector comprising:

a light source device emitting a light containing a first color light, a second color light, and a third color light different in color from one another;

a light modulator modulating the first color light, the second color light, and the third color light emitted from the light source device based on an image signal; and a projection optical device projecting the light output from the light modulator, wherein the light modulator has one liquid crystal panel, a multi-lens array provided at a light incident side of the liquid crystal panel and respectively entered by the first color light, the second color light, and the third color light emitted from the light source device at different angles, and a light refractor array provided at a light exiting side of the liquid crystal panel, the liquid crystal panel has a plurality of pixels containing a first pixel, a second pixel, and a third pixel, each of the plurality of pixels has a first sub-pixel entered by the first color light collected by the multi-lens array, a second sub-pixel placed adjacent to the first sub-pixel in a first direction and entered by the second color light collected by the multi-lens array, and a third sub-pixel placed adjacent to the second sub-pixel in the first direction and entered by the third color light collected by the multi-lens array, the multi-lens array has a plurality of lenses provided to correspond to each of the plurality of pixels and respectively entered by the first color light, the second color light, and the third color light at different angles, the light refractor array has a first light refractor placed over a boundary between the first pixel and the second pixel adjacent to the first pixel in the first direction of the plurality of pixels, and a second light refractor placed over a boundary between the first pixel and the third pixel adjacent to the first pixel at an opposite side to the first direction, the third color light emitted from the third sub-pixel of the first pixel and the first color light emitted from the first sub-pixel of the second pixel enter the first light refractor, and the first color light emitted from the first sub-pixel of the first pixel and the third color light emitted from the third sub-pixel of the third pixel enter the second light refractor.

2. The projector according to claim 1, wherein the light refractor array further has a third light refractor provided between the first light refractor and the second light refractor in the first direction and entered by the second color light, and the second color light emitted from the second sub-pixel of the first pixel enters the third light refractor.

3. The projector according to claim 1, wherein each of the first light refractor and the second light refractor includes lenses arranged at an equal pitch to an arrangement pitch of the lenses in the multi-lens array, and a position of a lens boundary in the first light refractor and the second light refractor is displaced by 0.2 a or more and 0.5 a or less with respect to a boundary between the first pixel and the second pixel or a boundary between the first pixel and the third pixel, where a dimension of the pixel in the first direction is a.

4. The projector according to claim 1, wherein $D1 \leq 0.5\,D$, where a distance between an optical axis of the first light refractor and an optical axis of the second light refractor is D, and a distance between an end portion at the second light refractor side of the first light refractor and an end portion at the first light refractor side of the second light refractor is D1.

5. The projector according to claim 4, wherein $D1 > 0$, and the light refractor array has a planar portion between the first light refractor and the second light refractor.

6. The projector according to claim 1, wherein the first light refractor is a lens having a symmetrical shape with respect to a lens optical axis, and the lens optical axis of the first light refractor is placed on a boundary line between the first pixel and the second pixel in a second direction orthogonal to the first direction, in which the multi-lens array, the liquid crystal panel, and the light refractor array are arranged.

7. The projector according to claim 1, wherein each of the first light refractor and the second light refractor has a truncated cone shape having an outer shape tapered in a direction away from the liquid crystal panel and an end as a planar surface.

* * * * *